United States Patent [19]

Shackle

[11] Patent Number: 5,229,225
[45] Date of Patent: Jul. 20, 1993

[54] SOLID ELECTROLYTE COMPOSITION
[75] Inventor: Dale R. Shackle, Morgan Hill, Calif.
[73] Assignee: Valence Technology, Inc., San Jose, Calif.
[21] Appl. No.: 943,885
[22] Filed: Sep. 11, 1992
[51] Int. Cl.$^5$ .............................................. H01M 6/18
[52] U.S. Cl. ...................................... 429/191; 429/192
[58] Field of Search ........................ 429/192, 191, 34; 252/62.2; 204/421

[56] References Cited

U.S. PATENT DOCUMENTS

| | | |
|---|---|---|
| 3,734,876 | 5/1973 | Chu . |
| 4,303,748 | 12/1981 | Armand et al. . |
| 4,357,401 | 11/1982 | Andre et al. . |
| 4,357,610 | 2/1982 | Kingston et al. . |
| 4,556,614 | 12/1985 | LeMehaute et al. . |
| 4,638,407 | 1/1987 | Lundsgaard et al. . |
| 4,654,279 | 3/1987 | Bauer et al. . |
| 4,748,542 | 5/1981 | Lundsgaard et al. . |
| 4,792,504 | 12/1988 | Schwab et al. . |
| 4,822,701 | 4/1989 | Ballard et al. . |
| 4,830,939 | 5/1989 | Lee et al. . |
| 4,990,413 | 2/1991 | Lee et al. . |
| 5,037,712 | 8/1991 | Shackle et al. . |

FOREIGN PATENT DOCUMENTS

0145498A2  6/1985  European Pat. Off. .

*Primary Examiner*—Anthony Skapars
*Attorney, Agent, or Firm*—T. Gene Dillahunty

[57] ABSTRACT

A solid electrolyte having solvent ligands and polymer ligands coordinated with metal ion exhibits improved stability and resistance to volatilization or migration of liquid phase components. The solid electrolyte of this invention comprises a metal salt to provide a metal ion which is coordinated with a molar ratio of ligands appropriate to the metal ion. For lithium ion the ratio is between about 1:3 and about 1:6 moles of lithium salt to moles of ligands, where the ligands comprise about 10% to about 60% by weight structural network crosslinked polymer and about 40% to about 90% by weight aprotic solvent.

6 Claims, No Drawings

SOLID ELECTROLYTE COMPOSITION

FIELD OF THE INVENTION

This invention relates to solid electrolyte compositions and methods of making the compositions.

BACKGROUND OF THE INVENTION

Solid electrolyte compositions useful in the manufacture of solid state electrochemical devices are known in the art. In particular, solid electrolyte compositions comprising a polymeric network interpenetrated by an ionically conducting liquid phase are known.

Schawb et al., in U.S. Pat. No. 4,792,504, disclose solid polymeric electrolytes comprising a continuous network of crosslinked polyethylene oxide containing an ionic conducting phase which includes a metal salt and a bipolar aprotic solvent. The system comprises a two-phase system of a crosslinked polymer network phase which provides the structure for containing an ionic conducting phase in which a liquid complexed with a lithium salt is absorbed or interpenetrated and held as the ionic conducting phase.

Lee et al., in U.S. Pat. No. 4,830,939, disclose a similar solid electrolyte composition wherein the polymeric network is formed of radiation polymerizable compounds and the ionic conducting phase is formed of a radiation inert material.

Lee et al., in U.S. Pat. No. 4,990,413, disclose another solid electrolyte composition comprising a solid ionically conductive powder as part of the ionically conductive material contained in the polymeric network.

Shackle et al., in U.S. Pat. No. 5,037,712, disclose a solid electrolyte containing radiation curable polysiloxane materials as part of the crosslinked polymer network structure containing the ionically conducting liquid phase.

Other disclosures of solid electrolytes in this field include Bauer et al., U.S. Pat. No. 4,654,279; LeMehaute, et al., U.S. Pat. No. 4,556,614 and Andre et al., U.S. Pat. No. 4,357,610. In these patents, as well as the patents mentioned above, the polymer network which provides the basic solid structure for the electrolyte is formed from any number of polyethylinically unsaturated monomers which are polymerized or copolymerized with other monomers by various polymerization mechanisms, including radiation crosslinking. The polymeric network structure can be formed from crosslinkable polysiloxanes, crosslinkable polyethylene oxide, various acrylates, epoxy resins, polyacrylonitrile matrix resins as well as other resins appropriate for the properties desired in the solid electrolyte structure.

The ionically conductive phase, typically referred to as the liquid interpenetrating phase, typically comprises propylene carbonate, gamma-butyrolactone, 1,3-dioxolane, tetrahydrofurans, polyethylene glycol dimethyl ethers, glymes, and other materials which are capable of complexing with or solubilizing the desired lithium salt or sodium salt. Particular lithium salts, sodium salts and ammonium salts are known in the art, as disclosed in the above referenced patents.

The disclosures of the above patents are incorporated herein by reference.

It has been found that in some end use applications of electrochemical devices, such as batteries or capacitors containing the solid electrolytes, a problem has been noted in that under certain conditions the so-called liquid phase of the solid electrolyte can migrate and sometimes volatilize from the solid electrolyte. It is desirable that a solid electrolyte be provided in which the liquid phase material is held more permanently in the polymeric network structure to thereby prevent the liquid phase material from migrating or volatilizing.

SUMMARY OF THE INVENTION

This invention provides in one aspect a solid electrolyte composition comprising a lithium, sodium or ammonium salt which is coordinated with an appropriate ratio of a ligand component whereby the coordinated ligands are held in coordination with the lithium sodium or ion in sufficient strength to prevent the migration or volatilization of the liquid phase portion of the ligands at conditions under which the solid electrolyte composition is used in electrochemical devices. According to the present invention, the lithium or sodium salt is coordinated with a molar ratio of ligands appropriate for the positive ion in the salt, for example, for a lithium salt the molar ratio of lithium salt to ligands is generally between about 1:3 and about 1:6 moles of lithium salt to moles of ligands. The ligand component includes the crosslinked polymer which provides the continuous network structure of the solid electrolyte wherein the crosslinked polymer comprises compatible sites thereon for coordination with the positive ion in the salt, such as a lithium ion. In addition, the ligand component comprises an aprotic solvent which is likewise compatible for coordination with the same positive ion in the salt. The ligand component of the solid electrolyte generally comprises from about 10% to about 60% by weight of continuous network crosslinked polymer part and from about 40% to about 90% by weight of the aprotic solvent part.

The solid electrolyte composition according to this invention is formulated around the positive ion of the salt, whereby the appropriate molar ratio of ligands is employed to enable the ligands that are present to fully coordinate with the positive ion in the salt. In this aspect the proper molar ratio of salt to ligands provides a fully complexed and bound (coordinated) ligand component, thereby providing a stable solid electrolyte and preventing liquid phase or aprotic solvent part of the ligand component from migrating or volatilizing from the electrolyte. It is believed, for example, that in the case of a lithium salt the lithium ion coordinates with appropriate sites on the continuous network of crosslinked polymer, and the lithium component is thereby immobilized by a coordination bonding to the polymer structure. Likewise, the liquid phase or aprotic solvent part, such as propylene carbonate, is bound by a coordination attraction to the lithium ion, thereby immobilizing the propylene carbonate. Employing the appropriate molar ratios according to the present invention provides a solid electrolyte which is fully coordinated and does not contain excess aprotic solvent which is uncoordinated and available to migrate or volatilize.

In other aspects, this invention provides a method of making the solid electrolyte described above. In yet another aspect, this invention comprises electrochemical devices containing a solid electrolyte composition in accordance with the above.

DETAILED DESCRIPTION OF THE INVENTION

The present invention provides a different solid electrolyte composition compared to the prior art and further provides a different basis for formulating and constructing the solid electrolyte matrix. Solid electrolyte compositions have typically been constructed by forming a crosslinked polymer network into which is absorbed or interpenetrated a liquid phase typically comprising an aprotic solvent which contains a lithium, sodium or ammonium salt in concentrations generally up to the solubility limit of the aprotic solvent. In these prior solid electrolyte compositions, the objective generally was to have the network polymer structure contain as much aprotic solvent and ionic salt as possible. It has generally been accepted that the more aprotic solvent liquid phase contained in the polymer network structure the better conductivity and capacity the solid electrolyte will exhibit.

According to the present invention, the solid electrolyte composition is formulated based on the lithium or sodium ion of the salt present in the electrolyte composition. In formulating the electrolyte composition in this manner, the appropriate ratios and proportions of network structure polymer and the aprotic solvent component can be used to assure the full coordination between the positive ion of the total amount of ligand present so that the resulting solid electrolyte composition does not contain uncoordinated aprotic solvent which can migrate and/or volatilize. Following the disclosure herein, it will be recognized by one skilled in the art that the total ligand portion of the electrolyte composition includes the network structure crosslinked polymer, to the extent that it has active sites thereon which are compatible for coordination with the positive ion of the salt, and includes the aprotic solvent, which is also compatible for coordination with the positive ion.

In general, the ligand molar ratio for a lithium salt in the solid electrolyte composition should be no more than about 1:6 moles of lithium salt to moles of total ligands. Preferably, the ratio for a lithium salt will be in the range of about 1:3 to about 1:6 moles of lithium salt to moles of ligand, more preferably the range will be between about 1:4 and about 1:6. For a sodium salt the ratio will also be generally from about 1:4 to about 1:6. The actual ratios employed in a particular electrolyte composition will depend on the particular salt used and will depend on the available sites on each ligand part which is available for coordination with the positive ion. It will also be recognized that the molar ratios in this regard are not direct stoichiometric ratios but are to some extent empirical ratios which can vary depending on the degree of coordination desired and the availability of compatible coordination sites per mole of network polymer or per mole of aprotic solvent. In this regard it is not necessary or desirable that every compatible coordination site on a polymer chain or an aprotic solvent molecule actually be coordinated with the positive ion. In general, if at least an average of one site per molecule is available for coordination with the positive ion, the desired degree of stability of the solid electrolyte composition will be achieved.

It is believed that the coordination of metal ion and ligand can be represented by the following structure. Although this representation is not to be considered as limiting the present invention, it is considered useful in formulation of solid electrolytes according to this invention to consider this type of proposed structure. As illustrated for a lithium ion in a network polymer and propylene carbonate (PC), the example would be as follows:

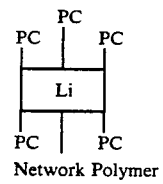

Network Polymer

With respect to the ligand component of the solid electrolyte composition of this invention, it is in general acceptable if the ligand component comprises up to about 60% by weight of a continuous network crosslinked polymer with the remaining portion of the ligand component comprising an aprotic solvent. Also in general, it is desirable to have at least about 10% of the ligand component being the continuous network crosslinked polymer in order to provide sufficient structural aspect of the solid electrolyte composition. More preferably, the ligand component can comprise between about 15% and about 40% by weight of continuous network crosslinked polymer and between about 60% and 85% by weight aprotic solvent. A most preferred ligand component comprises between about 20% about 30% by weight continuous network crosslinked polymer and between about 70% and about 80% by weight aprotic solvent. The ligand component can contain other additives and materials which are not incompatible with the solid electrolyte composition structure and which do not interfere with the coordination of the ligands or the retention of the aprotic solvent in the electrolyte composition in accordance with the teachings of this invention.

It has generally been understood in the prior art that increased amounts of aprotic solvent, such as propylene carbonate, in a solid electrolyte composition was desirable for providing increased conductivity. However, it has now been found that the lower ratios of the aprotic solvent to the network polymer provide a solid electrolyte having acceptable conductivity plus has improved structural and stability properties over those electrolyte compositions having higher ratios aprotic solvent. Similarly, the lower ratios of ligand component to the metal salt, as employed in the solid electrolyte compositions of this invention, still provide acceptable conductivity and provide superior structural and stability properties.

The solid electrolyte compositions according to the present invention can be prepared by any appropriate method known in the related art. For example, the network polymer can first be formed by crosslinking, then the crosslinked polymer interpenetrated with the mixture of aprotic solvent and metal. Alternatively, the aprotic solvent, salt and the monomers which are the precursors of the network crosslinked polymer can be mixed, then the network polymer crosslinked by an appropriate curing mechanism, i.e., catalytically, by radiation curing and the like. Other methods of manufacture will be apparent to one skilled in the art. Regardless of the method of manufacture, it is important according the present invention that the appropriate ratios of lithium salt and/or sodium salt to total ligand content be observed along with, in the ligand component, the appropriate ratio of network crosslinked polymer content relative to the aprotic solvent content, as set forth above.

Having described the present invention in detail, the following examples are now set forth as illustrations of particular embodiments of this invention.

EXAMPLE 1

|         | Moles | Wt.     | %      |
|---------|-------|---------|--------|
| PC      | 4.97  | 506.9 g | 63.35% |
| LiAsF$_6$ | 1     | 196.0 g | 24.50% |
| PEO     | 0.20  | 17.6 g  | 2.20%  |
| PEGDA   | 0.748 | 65.8 g  | 8.22%  |
| TMPEOTA | 0.078 | '13.8 g | 1.72%  |

The above components are mixed in the proportions given and the network polymer components then crosslinked by radiation curing.

The solid electrolyte composition formed above can be used, for example, in a cathode structure comprising an 80 micron thick layer of a composition comprising 45% by weight V$_6$O$_{13}$ together with 10% carbon and 45% by weight of the above electrolyte composition.

EXAMPLE 2

Thus the formulation for an electrolyte designed to supply LiAsF$_6$ to the cathode would be as follows:

| LiAsF$_6$ | 337 g    | 35.8%  |
|-----------|----------|--------|
| PC        | 506.9 g  | 53.87% |
| PEO       | 17.6 g   | 1.87%  |
| PEGDA     | 65.8 g   | 6.99%  |
| TMPEOTA   | 13.78 g  | 1.46%  |
|           | 941.11 g |        |

EXAMPLE 3

|         | Weight | Percentage |
|---------|--------|------------|
| PC      | 114 g  | 57.0 %     |
| LiAsF$_6$ | 50 g   | 25.0%      |
| PEO     | 6 g    | 3.0%       |
| PEGDA   | 26 g   | 13.0%      |
| TMPEOTA | 4 g    | 2.0%       |

The above materials were mixed at 75° C. until solution was completed. It was then coated onto a previously prepared radiation cured cathode prepared as in Example 1. The thickness of the electrolyte was 50 microns. A piece of lithium metal foil was then placed on the electrolyte layer. The lithium was smoothed by a 2" diameter steel roller to insure intimate contact between the electrolyte and lithium. The cells produced by the above example were tested and found to produce batteries with high power performance.

I claim:

1. A solid electrolyte composition comprising a lithium ion or a sodium ion in the form of a salt coordinated with ligands in a ratio of about 1:3 to about 1:6 moles of lithium or sodium salt to moles of ligands wherein the ligands comprise up to about 60% by weight of a continuous network crosslinked polymer having compatible sites thereon for coordination with said lithium or sodium ion and up to about 90% by weight of an aprotic solvent which is compatible for coordination with said lithium or sodium ion, wherein said aprotic solvent comprises ethylene carbonate, propylene carbonate, gamma-butyrolactone, 1,3-dioxolane, a tetrahydrofuran, dimethyl sulfoxide, a polyethylene glycol dimethyl ether or a glyme.

2. A solid electrolyte composition according to claim 1 wherein the salt comprises a lithium salt.

3. A solid electrolyte composition according to claim 1 wherein the ratio of salt to ligands is from about 1:4 to about 1:6.

4. A solid electrolyte composition according to claim 1 wherein the ligands comprise from about 10% to about 30% by weight network crosslinked polymer and from about 70% to about 90% by weight aprotic solvent.

5. A solid electrolyte composition according to claim 4 wherein the polymer comprises about 15% to about 25% by weight and the aprotic solvent comprises about 75% to about 85% by weight of the ligands.

6. An electrochemical cell comprising an electrolyte wherein the electrolyte comprises a solid electrolyte composition comprising a lithium ion or a sodium ion in the form of a salt coordinated with ligands in a ratio of about 1:3 to about 1:6 moles of lithium or sodium salt to moles of ligands wherein the ligands comprise up to about 60% by weight of a continuous network crosslinked polymer having compatible sites thereon for coordination with said lithium or sodium ion and up to about 90% by weight of an aprotic solvent which is compatible for coordination with said lithium or sodium ion, wherein said aprotic solvent comprises ethylene carbonate, propylene carbonate, gamma-butyrolactone, 1,3-dioxolane, a tetrahydrofuran, dimethyl sulfoxide, a polyethylene glycol dimethyl ether or a glyme.

* * * * *